United States Patent [19]

Horner et al.

[11] Patent Number: 4,765,714
[45] Date of Patent: Aug. 23, 1988

[54] BINARY PHASE-ONLY OPTICAL CORRELATION SYSTEM

[76] Inventors: Joseph L. Horner, 76 Brattle St., Cambridge, Mass. 02138; James R. Leger, 162 Flavell Rd., Groton, Mass. 01450

[21] Appl. No.: 834,092

[22] Filed: Feb. 27, 1986

Related U.S. Application Data

[63] Continuation-in-part of Ser. No. 596,471, Apr. 3, 1984, Pat. No. 4,588,260.

[51] Int. Cl.$^4$ .......................... G02B 27/46; G06G 9/00
[52] U.S. Cl. ................................ 350/162.13; 364/822
[58] Field of Search ................... 364/822; 350/162.12, 350/162.13, 162.14

[56] References Cited

U.S. PATENT DOCUMENTS

| | | | |
|---|---|---|---|
| 4,251,160 | 2/1981 | Bouwhuis et al. | 356/401 |
| 4,405,238 | 9/1983 | Grobman et al. | 356/401 |
| 4,419,013 | 12/1983 | Heimer | 356/400 |
| 4,441,250 | 4/1984 | Imahashi | 29/578 |

OTHER PUBLICATIONS

Veldkamp, Wilfrid B. et al., "Binary Holographic LO Beam Multiplexer for IR Imaging Detector Arrays," *Applied Optics*, vol. 22, No. 10, 15 May 1983, pp. 1497-1507.
Horner, Joseph L. et al., "Phase–Only Matched Filtering," *Applied Optics*, vol. 23, No. 6, 15 Mar. 1984, pp. 812-816.
Jutamulia, T. et al., "Non-Holographic Matched Spatial Filters," *Optics Communications*, vol. 52, No. 3, 1 Dec. 1984, pp. 160-164.
Vander Lugt, A., "Signal Detection by Complex Spatial Filtering," *IEEE Transactions on Information Theory*, vol. IT-10, No. 2, Apr. 1964, pp. 139-145.
Horner, Joseph L., "Light Utilization in Optical Correlators," *Applied Optics*, vol. 21, No. 24, Dec. 15, 1982, pp. 4511-4514.
Cooley and Tukey, "An Algorithm for the Machine Calculation of Complex Fourier Series," *Mathematics of Computation*, vol. 19, No. 90, Apr. 1965, pp. 297-301.
Horner, Joseph L. et al., "Applying the Phase-Only Filter Concept to the Synthetic Discriminant Function Correlation Filter," *Proc. of the SPIE*, vol. 519, H. John Caulfield-Editor, "Analog Optical Processing and Computing," Oct. 25-26, 1984, pp. 70-77 (shipping date Feb. 5, 1985).

*Primary Examiner*—Bruce Y. Arnold
*Attorney, Agent, or Firm*—Jacob N. Erlich; Donald J. Singer

[57] ABSTRACT

A binary phase-only optical correlation system incorporating therein a binary phase-only filter. The binary phase-only optical filter is made by mathematically generating preselected phase-only information by a fast Fourier Transform technique. This generated phase-only information is binarized into a function having two values. This binarized function is utilized to produce a mask which in turn is used in conjunction with an appropriate optical substrate to produce the binary phase-only filter. The manufacture of the binary phase-only filter is substantially easier than the production of a phase-only filter yet virtually the same correlation results when the binary phase-only filter when it is used in an optical correlation system.

4 Claims, 5 Drawing Sheets

BINARY PHASE-ONLY OPTICAL CORRELATION SYSTEM

STATEMENT OF GOVERNMENT INTEREST

The invention described herein may be manufactured and used by or for the Government for governmental purposes without the payment of any royalty thereon.

REFERENCE TO RELATED APPLICATION

This application is a continuation-in-part of U.S. Application Ser. No. 596,471 entitled "PHASE-ONLY OPTICAL FILTER FOR USE IN AN OPTICAL CORRELATION SYSTEM" filed on Apr. 3, 1984 and now U.S. Pat. No. 4,588,260 issued May 13, 1986.

BACKGROUND OF THE INVENTION

This invention relates generally to optical correlators, and, more particularly, to a binary phase-only optical correlation system.

In recent years, the acceptance of optical correlation systems has greatly expanded because of their extreme usefulness in the processing of optical signals in, for example, the analysis of radar information or sonar information. More specifically, the optical correlator can effectively compare a pair of optical signals and by an analysis of intensity peaks determine information with respect to the optical signals. The Vander Lugt optical correlator, in particular, has proven to be an effective and valuable addition to the collection of optical processing systems. The Vander Lugt optical correlator has found applicability in such diverse applications as classifying diatoms and inspecting welding seams. It is an extremely powerful optical instrument because it can search an input beam for a desired pattern without any mechanical motion and provide a simple way to fabricate a matched filter. An excellent description of such a Vander Lugt optical correlator can be found in a paper published by A. Vander Lugt entitled "Signal Detection by Complex Spatial Filtering," *IEEE Transactions on Information Theory*, Volume IT-10, No. 2, Apr. 1964, pages 139 through 145.

In a practical working optical correlation system it is desirable that the overall utilization of the laser light source be as efficient as possible. It is possible to measure the utilization of the laser light source by the ratio of light energy in the correlation spot in the output plane to the light energy at the input plane as discussed in greater detail by one of the present inventors in an article entitled "Light Utilization in Optical Correlators," *Applied Optics*, Vol. 21, No. 24, Dec. 15, 1982, pgs. 4511–4514. A high throughput of light is desirable in a practical working system in order to keep the laser power requirements as small as possible in order for such a correlation system to be usable in, for example, a portable or airborne system, and to achieve a high signal-to-detector noise ratio.

In the past, such as with the above-mentioned Vander Lugt optical correlator, the filter was formed holographically on a photosensitive plate such as, for example, a black and white holographic film such as 649F. The light throughput of the system is determined by the optical efficiency of the filter. Unfortunately, as pointed out in the above-mentioned article entitled "Light Utilization in Optical Correlators," the efficiency of the matched filter utilized with the Vander Lugt correlator, even if made on a perfect medium, would only produce an efficiency of 44.4 percent for a simple rectangular function input. In a number of applications, where the use of a high power laser source is acceptable, such relatively low efficiency is permissible. However, in many of todays portable or airborn systems, in which a laser diode of low power is generally utilized as the light energy source, the efficiency of the matched filter becomes critical and therefore substantially limits the utilization of past optical correlators such as the above-mentioned Vander Lugt correlator.

The above problem has been recently overcome with the incorporation of a phase-only filter within the optical correlator system. In such a system only the phase of the Fourier transform is recorded on the filter. A more detailed description of the phase-only filter and its use within an optical correlation system is set forth in an article by one of the inventors entitled "Phase-only matched filtering," *Applied Optics*, vol. 23, No. 6, Mar. 15, 1984 and U.S. patent application Ser. No. 596,471 filed Apr. 3, 1984 entitled "Phase-only Filter for Use Within an Optical Correlation System," both of which being incorporated herein by reference.

Unfortunately, fabrication of phase-only filters of the type described above is a difficult process since the linearity of the recording process must be carefully controlled. Consequently, even though the use of phase-only filters within optical correlation systems have substantially increased the efficiency of their operation as a result of virtually no energy loss it would also be highly desirable to overcome the above-mentioned problems associated with phase-only optical correlation systems.

SUMMARY OF THE INVENTION

The present invention overcomes problems associated with optical correlators of the past and as described above by providing an optical correlation system which maintains its energy efficiency yet is substantially easier to produce. This is accomplished by the utilization of a binary phase-only filter within the optical correlator system, and by providing a specific method of fabricating such a binary phase-only filter.

In the present invention, it has been recognized that the use of a binary phase-only filter within an optical correlation system can produce excellent correlation with only a minimal increase in noise over the use of the phase-only filter as described in the above-mentioned *Applied Optics* publication entitled "Phase-only matched filtering" and U.S. patent application Ser. No. 596,471.

Of utmost importance is the fact that the present invention provides for a binary phase-only filter which is substantially easier to fabricate than the phase-only filter mentioned above. For example, it is easier to control, the two-phase levels can be set very accurately, and techniques from the makers of very large scale integrated circuits (VLSI) can be incorporated in its fabrication. Consequently, the binary phase-only optical correlation system of the present invention has substantially improved overall correlation performance.

It is therefore an object of this invention to provide an optical correlation system which incorporates therein a binary phase-only filter.

It is another object of this invention to provide a technique for the fabrication of a binary phase-only filter.

It is an even further object of this invention to provide a binary phase-only optical correlation system which is capable of providing an extremely high degree of discrimination between signals.

It is still another object of this invention to provide a binary phase-only filter and binary phase-only optical correlation system which is economical to produce and which utilizes conventional, currently available components in the manufacture thereof.

For a better understanding of the present invention, together with other and further objects thereof, reference is made to the following description, taken in conjunction with the accompaning drawings and its scope will be pointed out in the appended claims.

DETAILED DESCRIPTION OF THE PREFERRED EMBODIMENT

In order to more clearly understand the concepts involved in the production of the binary phase-only correlation filter of the present invention and its use within a binary phase-only optical correlation system it is first necessary to understand the basic idea of correlation. In general, correlation (that is, the comparison of a pair of functions) can be implemented either optically in an optical system such as the abovementioned Vander Lugt optical correlator or digitally on a digital computer. Even more basically, correlation involves the sliding of one function across the other function and adding up the common areas. Stated more succinctly, correlation is a measure of just how alike two functions are. Mathematically, correlation is defined by the following equation (1):

$$C_{(\tau)} = \int f(x) \cdot g(x-\tau) dx \tag{1}$$

where
- $C_{(\tau)}$ = the correlation function;
- f(x) = one input function; and
- g(x−$\tau$) = another function, displaced by an amount $\tau$.

Figure 1:
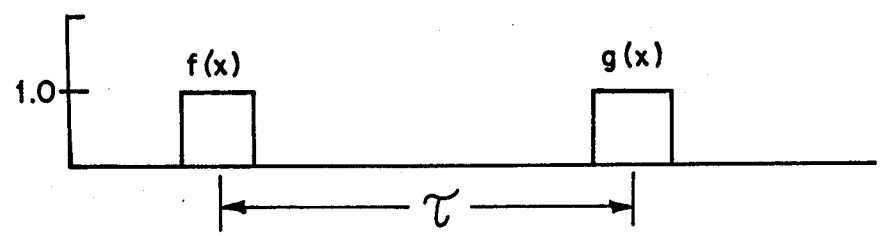
FIG. 1 is a graphic representation of the functions f(x) and g(x) displaced by a distance $\tau$ during correlation.
Figure 2:
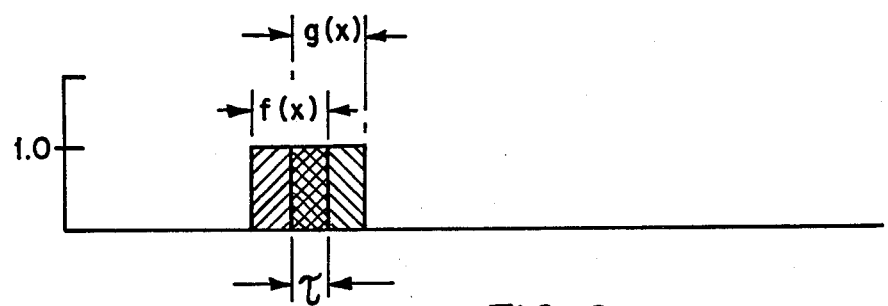
FIG. 2 is a graphic representation of the functions f(x) and g(x) beginning to overlap each other during correlation.

Illustrated graphically, and as shown in FIG. 1 of the drawings each of the functions f(x) and g(x) have a height of, for example, 1.0 and are displaced from one another by a distance $\tau$. If these functions f(x) and g(x) are multiplied together in accordance with equation (1) then the product everywhere is zero when they do not overlap. As the functions begin to overlap as shown in FIG. 2 of the drawings, there will be a contribution to the correlation integral of equation (1).

Figure 3:
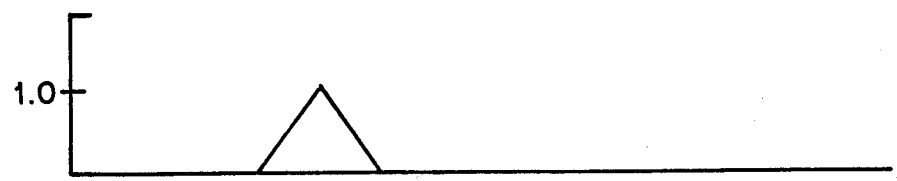
FIG. 3 is a graphic representation of the correlation of the functions f(x) and g(x)

FIG. 3 illustrates graphically the correlation of the two rectangle functions f(x) and g(x). The peak height of the correlation function, occurring at $\tau=0$, is equal to the area under the product of the two functions.

Another method of producing the results set forth by the correlation calculation of equation (1) is to operate in the Fourier Transform domain. Equation (2) set forth below mathematically illustrates this relationship, sometimes referred to as the Wiener-Kinchine theorem.

$$C_{(\tau)} = \mathcal{F}^{-1}(F(\omega) \cdot G^*(\omega)) \tag{2}$$

where
- $C(\tau)$ = the correlation function:
- $F(\omega)$ = the Fourier Transform of one of the functions:
- $G(\omega)$ = the Fourier Transform of the other function:
- * = the complex conjugation operator: and
- $\mathcal{F}^{-1}$ = the inverse Fourier Transform operator.

In other words, as set forth in equation (2), it is readily understandable that the correlation of the two functions is given by the inverse Fourier Transform of the product of the Fourier transforms of each of the two functions, where the Fourier Transform of a function is defined by the following equation (3).

$$F(\omega) = \mathcal{F}(f(x)) = \int_{-\infty}^{\infty} f(x) e^{-i\omega x} dx \tag{3}$$

Stated more succinctly, the Vander Lugt optical correlator makes use of the so-called Wiener Khinchine theorem to perform its correlation as set forth in equation (2).

Figure 4:
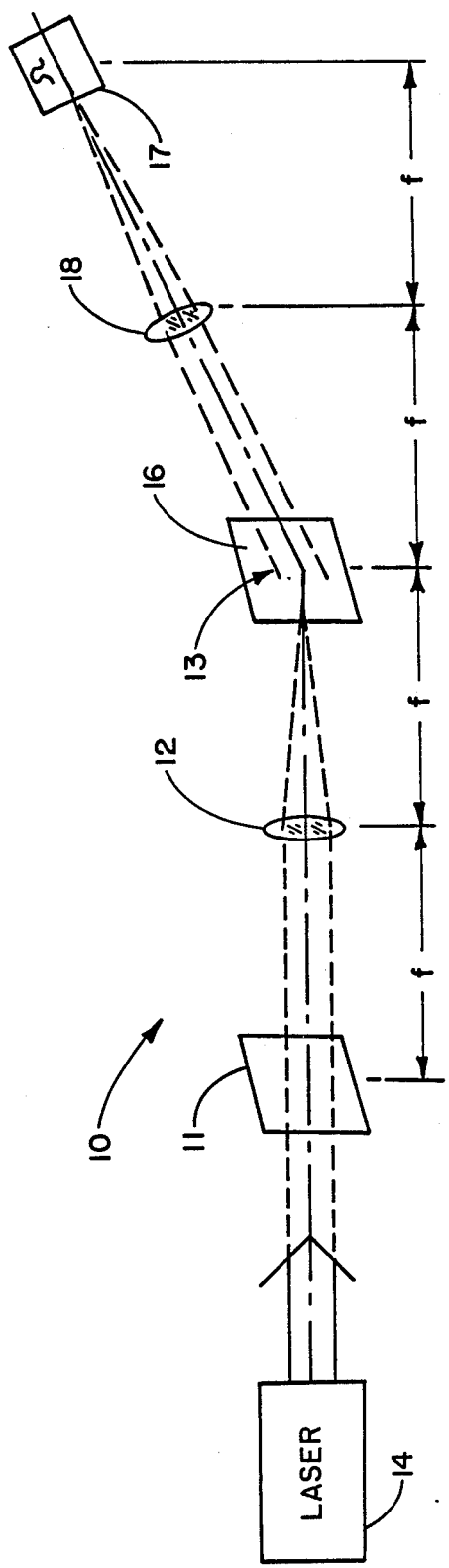
FIG. 4 is a schematic illustration of the basic components of the Vander Lugt optical correlator.

An optical correlation of the functions f(x) and g(x) can be performed by means of the conventional Vander Lugt correlator of the type described in the above-cited article in *IEEE Transactions on Information Theory*. In the Vander Lugt correlator 10 as shown in FIG. 4 of the drawings the function f(x) is "written" on a film 11 which is located one focal length, f, in front of a Fourier Transform lens 12. One focal length, f, on the other side of lens 12 is the focal plane or, as mathematically expressed, the Fourier Transform plane. It is in this plane 13 that an almost exact representation of the Fourier Transform of signal f(x) appears. Such a signal appears "written" on the light (electromagnetic beam) from a laser source 14 utilized in the conventional Vander Lugt correlator. As pointed out above in the Vander Lugt optical correlator this laser source 14 must be in the form of a high power laser. The resultant signal is a complex signal where the amplitude of the light corresponds to the amplitude of the Fourier transform and the phase of the light corresponds to the phase of the Fourier Transform. The Vander Lugt correlator 10 holographically encodes such a complex signal on a medium 16 such as a holographic film that only responds to intensity. Such a procedure (as briefly described above) is conventional and capable of producing a conventional and well recognized matched or classical matched filter. Correlation between functions of signals f(x) and g(x) which is formed in the plane 17 one focal length, f, away from Fourier Transform lens 18, is obtained as a result of the Fourier Transform of the product of the signal $F(\omega)$ and the signal $G(\omega)$. (The forward Fourier transform performed by lens 18 simply produces an inverted correlation result $C_{(-\tau)}$).

There are three major problems associated with the classical matched filter of the type described above and made by the Vander Lugt correlation technique. The first problem is a scale variance problem while the second problem is a rotation variance problem. Scale and rotation variance problems come about as a result of the basic definition of correlation, see equation (1) and equation (2) above. If the object changes scale, a different size results and the correlation peak diminishes. The above problems place severe practical limitations on the use of past optical correlators for target identification. The same is true of rotation, since the object will then appear to the optical system at a different angle or a different aspect such that the filter may be incapable of recognizing it.

Past solutions to this problem involve taking different sizes of the same object and different angular aspects of the same object and combining them on a single filter. Unfortunately, while this solution may solve the problem of variation of scale and rotation, they lead to a very low utilization of the input light source. This is the third and most important problem associated with the matched filter. In other words, most of the input light source energy is dissipated in the filter itself. Consequently, one must use an extremely powerful laser source in order to have sufficient light available for correlation plane detection.

Such a problem is clearly addressed by one of the inventors in his article referred to hereinabove entitled "Light Utilization in Optical Correlators" and discussed under the Background of the Invention. By the utilization of phase alone as described in the previously mentioned article by one of the inventors entitled "Phase-only matched filtering" and U.S. patent application Ser. No. 596,471, it is possible to develop a correlation system capable of adequately discriminating between characters as well as effecting high optical efficiency.

Figure 5:
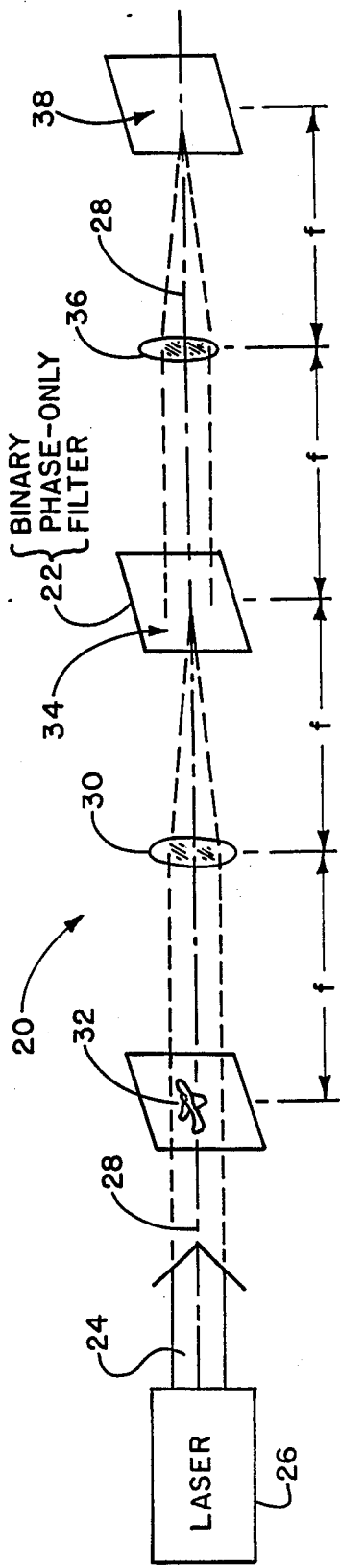
FIG. 5 is a schematic representation of the binary phase-only correlation system of the present invention.

The present invention even further simplifies correlation over past correlation techniques by providing a binary phase-only optical correlation system 20 as schematically illustrated in FIG. 5 of the drawings. The binary phase-only correlation system 20 of the present invention incorporates therein a binary phase only filter 22 and will be described in detail hereinbelow.

This simplification of correlation of the present invention is further effected by the unique method of fabrication of the binary phase-only filter. Initially, the binary phase-only filter relies upon the desired phase-only information being calculated. This calculation can be carried out in a conventional manner by any suitable computer such as the VAX computer manufactured by Digital Equipment Corporation. These calculations (more commonly referred to as the Fast Fourier Transform (FFT)) are set forth by Cooley and Tukey in an article entitled "An Algorithm for the Machine Calculation of Complex Fourier Series," *Mathematics of Computation*, Volume 19, No. 90, Apr. 1965 pp 297–301, and incorporated herein by reference.

In such a procedure, the computer would first Fourier Transform the desired signal according to equation (3) set forth above. The resulting function $F(\omega)$ can be written as set forth in equation (4) below.

$$F(\omega) = |A(\omega)| e^{i\phi(\omega)} \qquad (4)$$

where $\omega$ is the spatial frequency variable.

The function $|A(\omega)|$ is referred to as the amplitude portion of the function, and $e^{i\phi(\omega)}$ is the phase portion.

Figure 6:
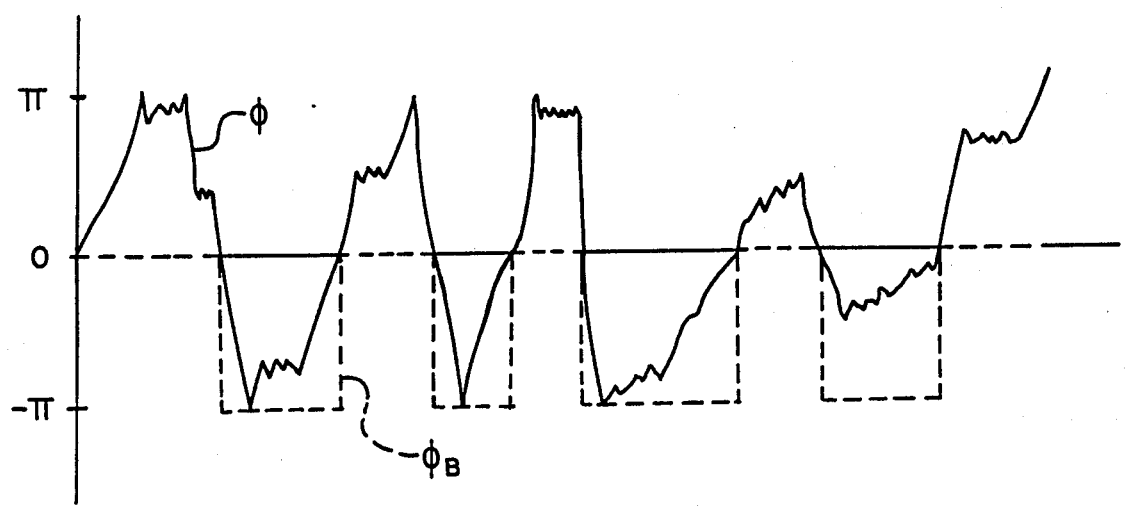
FIG. 6 is a graphic representation of the binarization (quantization) of phase only information to two values, 0 and $\pi$ during the initial step of fabricating the binary phase-only filter of the present invention.

Once the phase information is obtained the next step involves binarizing (or quantizing) this phase information. To more fully understand this binarization, reference is made to the graph of FIG. 6 of the drawings representative of the phase information, $\phi$, of a desired signal. This phase information $\phi$ is a continuous function taking on all values between $+\pi$ and $-\pi$ ($\pm 3.1416$). To binarize this function, that is, convert it into a function with only two values, it is necessary to test each value of the function. If the value is greater than 0, it is replaced with the value 0; if the value is less than or equal to 0 it is replaced with the value $-\pi$. The results of this non-linear operation for the function illustrated in FIG. 6 is illustrated by the function $\phi_B$ depicted by the dashed lines of FIG. 6.

Figure 7:
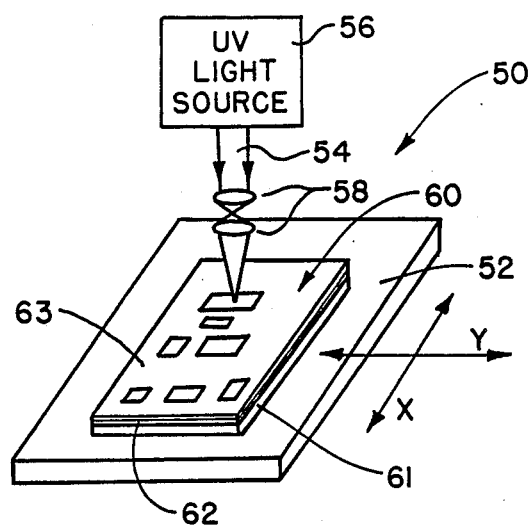
FIG. 7 is a pictorial representation of the production of the mask for the binarized phase-only filter of the present invention.

This binarized function is then recorded on a magnetic tape in a format acceptable to a conventional VLSI pattern (mask) generator of the type, for example, manufactured by GCA Corporation of Bedford, Mass. More specifically, and as schematically illustrated in FIG. 7 of the drawings, the pattern mask generator 50 is made up of a mask holder 52 capable of moving in the X and Y directions relative to an incoherent beam of UV light 54 emanating from UV light source 56. The UV light 54 is focused by appropriate lenses 58 on a raw (unexposed) mask substrate 60.

Typically the raw mask substrate 60 is in the form of a glass plate 61 coated with a 1200 Å layer of chromium 62 and having a 900 Å of AZ 1350-J positive working photoresist 63 over chromium layer 62. A typical photoresist 63 is manufactured by the Shipley Corporation of Wellesley Hills, Mass. The UV light beam impinges upon the photoresist 63 in accordance with the recorded binarized function represented by function $\phi_B$ illustrated in the graph of FIG. 6.

Figure 8:
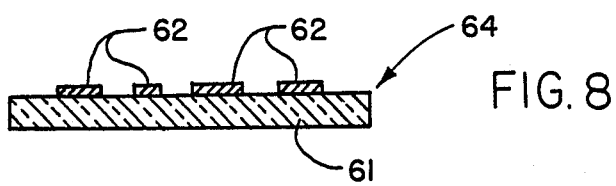
FIG. 8 is a cross-sectional side elevational view of the mask produced by the step illustrated in FIG. 7 after photoresist development.

After exposing photoresist 63 with the UV light 54 from mask generator 50 the mask 60 is developed. This is a process in which the regions of the photoresist 63 which were exposed to the UV light 54 are removed chemically to form a completed mask 64 illustrated in FIG. 8 of the drawings.

Figure 9:
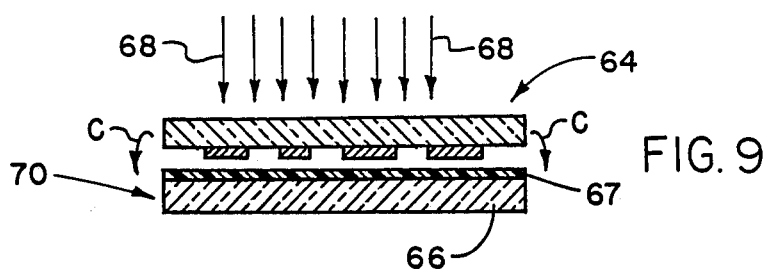
FIG. 9 is a cross-sectional view of the mask of FIG. 8 utilized in conjunction with an appropriate optical substrate to transfer the binary pattern from the mask of FIG. 8 to the substrate.

Next, as shown in FIG. 9, a high quality optical substrate 66 is coated with a thick layer (approximately 2–3 $\mu$m) of resist 67. Substrate 66 may be in the form of an optical flat, an example of which being Corning BK-7 stock finished to a very high optical figure (typically $\lambda/10$). Thereafter, mask 64 and substrate 66 are pressed together in intimate contact as is indicated by arrows C in FIG. 9 and exposed to an incoherent source of UV light 68. An example of the required energy of light 68 would be 25 mJ/cm$^2$ per 0.5 $\mu$m thickness of photoresist 67, typically yielding an exposure of between 5 and 60 seconds.

Figure 10:
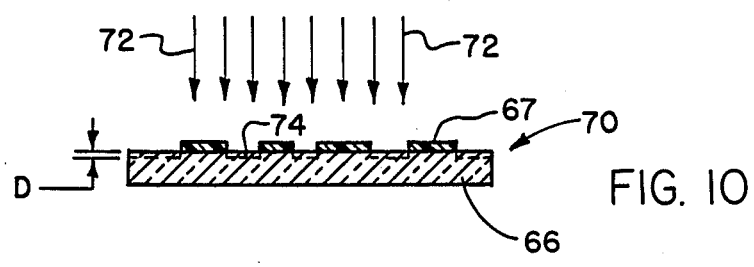
FIG. 10 is a cross-sectional view of the binary phase-only filter of this invention being produced by the step of ion bombardment reactive ion etching, sputter etching, or any other etching technique.
Figure 11:
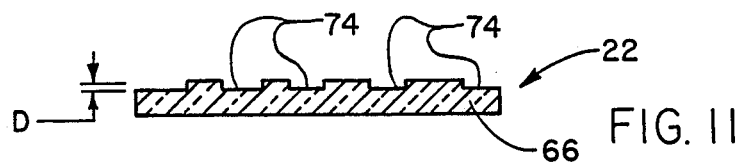
FIG. 11 is a cross-sectional view of the binary phase-only filter of the present invention.

After development, in which the exposed resist 67 is removed, the resultant product 70 is transferred to a conventional Ion Beam Etching Machine as manufactured by Perkin Elmer Corporation, where high energy gas ions 72 as depicted in FIG. 10 of the drawings transfer this desired binary pattern (function) into a relief pattern illustrated by the dashed lines 74 of FIG. 10. The finished product is a binary phase-only filter 22 shown in FIG. 11 of the drawings. The Ion Beam Etching technique is capable of producing high density, fine geometric patterns in metallic or nonmetallic substrates, all of which are extremely difficult to achieve with conventional wet chemical etching.

It is essential that the depth, D, of the etching be carefully controlled to a depth $D=\lambda/(2(n-1))$, where x is the wavelength of the coherent source of radiation 26 shown in FIG. 5, and n is the optical index of refraction of the substrate material 66 at the same wavelength. The product (filter) 70 is then removed from the Ion Beam Etching Machine, the resist 67 is removed from the substrate 66, and the fabrication of the binary phase only filter 22 is complete as clearly illustrated in FIG. 11. It should be noted that there are many variations possible on the above process. For example, an electron beam lithography system can be used in FIG. 7 to generate the original mask rather than using UV light. This has the advantage of better resolution. An imaging system can be used rather than contact printing in FIG. 9 to transfer the pattern to the substrate. And reactive ion etching and other etching techniques can be used in FIG. 10 rather than ion milling.

Once the binary phase-only filter 22 of the present invention has been fabricated by the above technique, it is now available for utilization within the binary phase-only correlation system 20 depicted in FIG. 5 of the drawings. As illustrated in FIG. 5 of the drawings the correlation plane is on-axis contrary to the off-axis relationship of past correlation systems (i.e., the Vander Lugt correlator shown in FIG. 4).

Reference is now made to FIG. 5 of the drawings which clearly illustrates, in schematic fashion, the binary phase-only optical correlator 20 which incorporates therein the binary phase-only correlation filter 22 made with the method of this invention. Similar to the Vander Lugt optical correlator 10 described hereinabove, a beam of electromagnetic radiation (light) 24 is provided by any suitable laser source 26 such as helium-neon laser with a wavelength of 632.8 nm. With correlator 20 the laser source is of low power (approximately 10 mW). Light beam 24 is directed by laser 26 along a preselected optical axis 28. Optically aligned with beam 24 and coincidental with the optical axis 28 are the remaining components of binary phase-only correlator 20.

A Fourier Transform lens 30 is placed in optical alignment with beam 24 along optical axis 28, one focal length, f, after an input "signal" 32 in the form of, for example, a spatial light modulator or film transparency of an object. Lens 30 forms the Fourier Transform of signal 32 (having both amplitude and phase information) at a preselected location 34, i.e. a focal length, f, beyond lens 30. It should be noted that all focal lengths within correlator 20 are equal in length.

The binary phase-only filter 22 is placed at location 34 and provides binarized phase-only information of another signal which is representative of the object to be compared with or correlated with the input signal 32. Situated one focal length, f, from location 34 is a second Fourier Transform lens 36. Lens 36 takes the Fourier Transform of the product of signal 32 and the binarized phase only information signal. This Fourier Transform is formed at location 38, one focal length, f, from lens 36, and still coincidental with optical axis 28. The Fourier Transform formed at 38 is substantially equivalent to the mathematical correlation function between signals, but with inverted coordinates.

Although binarization of the signal's phase function does represent a loss of some information, this is not a significant loss as pointed out in an article by the inventors entitled "Pattern recognition with binary phase-only filters," *Applied Optics*, Vol. 24, No. 5, Mar. 1, 1985, this article being incorporated herein by reference. In fact, this slight loss of information is more than made up for by the ease of manufacture of the binary phase-only filter 22 in the manner described hereinabove.

Figure 12:
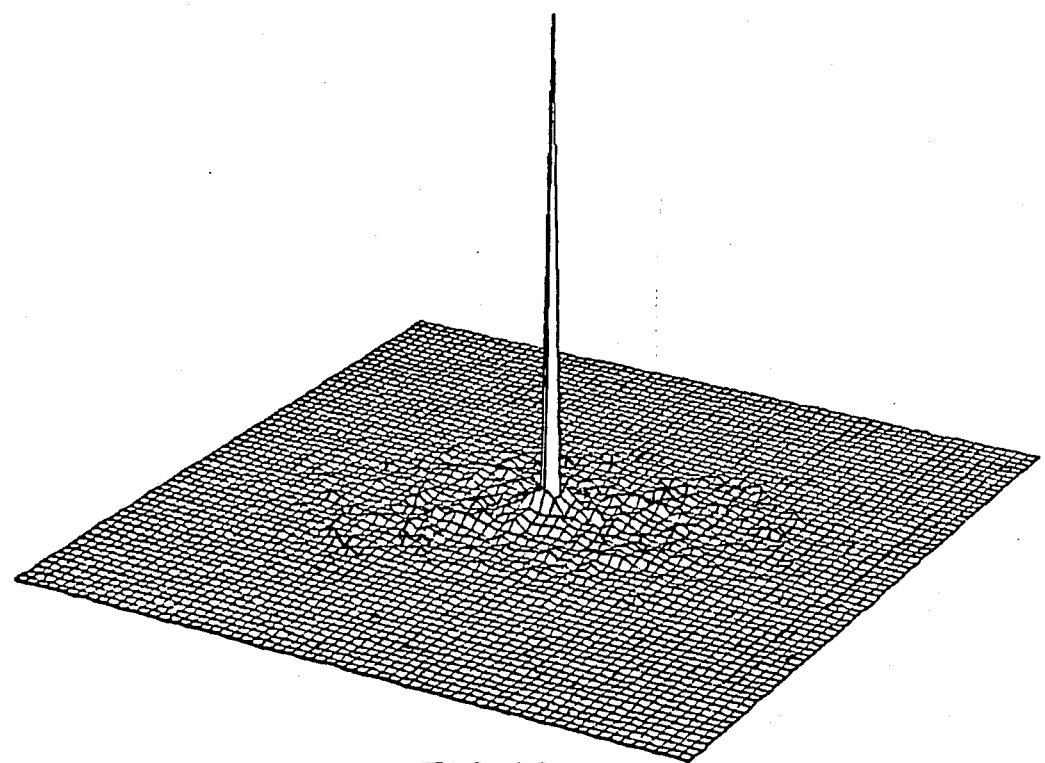
FIG. 12 is a three dimensional graphic representation of the correlation of an object with a phase-only optical correlation system.
Figure 13:
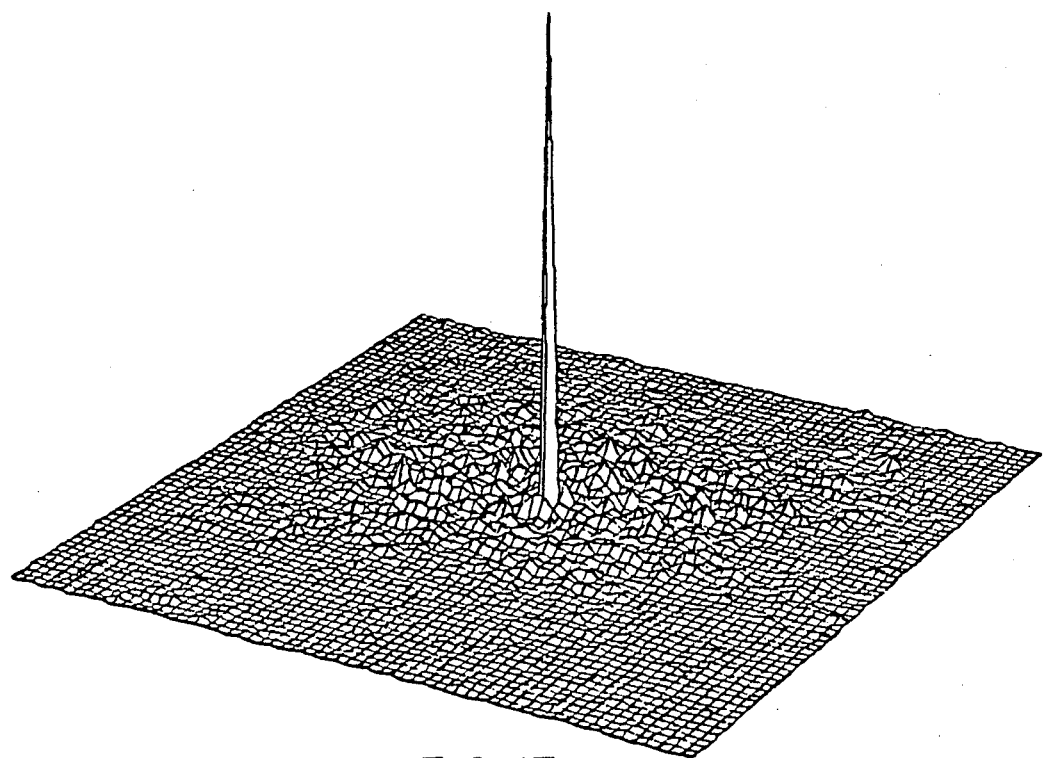
FIG. 13 is a three dimensional graphic representation of the correlation of an object with the binary phase-only correlation system of this invention.

In order to evaluate and substantiate the results produced by the binary phase only filter/correlation system of the present invention, a computer stimulation of the entire process was programmed using a 256×256 point fast Fourier transform. A correlation result from the use of such a binary phase-only optical correlator 20 can therefore be compared to the results obtained with the phase-only optical correlator of the type described in the above-mentioned *Applied Optics* article entitled "Phase-only matched filtering" and U.S. patent application Ser. No. 596,471. This comparison is illustrated in FIGS. 12 and 13 of the drawings wherein FIG. 12 depicts results from the phase-only system and FIG. 13 depicts the results from the binary phase only system of the present invention.

More specifically, the continuous phase function which, as set forth hereinabove and illustrated graphically in FIG. 6 contains values from $-\pi$ to $\pi$ is binarized or quantitized into two levels in the present invention by setting the function to zero if the original phase was positive and $-\pi$ if the original phase was negative. The choice of the quantization threshold is arbitrary. It is clearly evident from a comparison of the three dimensional graphic representations of FIGS. 12 and 13 that, for the same object, although background noise is slightly larger with the binary phase-only correlation system 20 of the present invention, the central peak is still quite high above this random background and, therefore, would be no problem to detect with conventional signal processing techniques, that is, a conventional threshold detector.

Although this invention has been described with reference to a particular embodiment, it will be understood that this invention is also capable of further other embodiments with the spirit scope of the appended claims.

We claim:

1. A binary phase-only optical correlation system comprising:
    means for providing a beam of low power electromagnetic radiation at a preselected wavelength and directing said beam along a preselected optical axis;
    means in optical alignment with said beam for taking the Fourier Transform of a preselected first signal and forming said Fournier Transform at a first preselected position coincidental with said optical axis;

a binary phase-only filter located at said first preselected position and in optical alignment with said preselected optical axis, said binary phase-only filter providing binarized phase-only information obtained from a second signal which is to be correlated with said first signal, and means in optical alignment with said binary phase-only filter for taking the Fourier Transform of the product of said first signal and said binarized phase-only information of said second signal forming said Fournier Transform at a second preselected position coincidental with said optical axis, said Fourier Transform being substantially equivalent to the mathematical correlation function between said first signal and said second signal;

whereby said binary phase-only optical correlation system provides substantially 100 percent utilization of said electromagnetic beam of radiation.

2. A binary phase-only optical correlation system as defined in claim 1 wherein said binary phase-only filter is produced on an optical flat having a pattern thereon defined by indented portions having a preselected depth, said indented portions being representative of said binarized phase-only information obtained from said second signal.

3. A binary phase-only optical correlation system as defined in claim 2 wherein said binary phase-only filter is produced on said optical flat from a mask which is developed by transferring said binarized phase-only information obtained from said signal such that said indented portions are of preselected depth equal to $\lambda/(2(n-1))$ where $\lambda =$ said preselected wavelength and $n =$ the index of refraction of said optical flat.

4. A binary phase-only optical correlation system as defined in claim 3 wherein said low power of said laser is approximately 10 mW.

* * * * *